US008608597B2

(12) United States Patent
Avnery et al.

(10) Patent No.: US 8,608,597 B2
(45) Date of Patent: Dec. 17, 2013

(54) HOCKEY STICK

(76) Inventors: Tzvi Avnery, Winchester, MA (US);
Scott L. Heitmann, Amesbury, MA (US)

( * ) Notice: Subject to any disclaimer, the term of this patent is extended or adjusted under 35 U.S.C. 154(b) by 252 days.

(21) Appl. No.: 13/227,735

(22) Filed: Sep. 8, 2011

(65) Prior Publication Data
US 2013/0065714 A1 Mar. 14, 2013

(51) Int. Cl.
*A63B 59/14* (2006.01)
(52) U.S. Cl.
USPC .......................... 473/563; 473/561; 264/241
(58) Field of Classification Search
USPC .......................... 473/560–563; 264/239, 241
See application file for complete search history.

(56) References Cited

U.S. PATENT DOCUMENTS

| 1,414,124 | A | | 4/1922 | Griffin | |
|---|---|---|---|---|---|
| 2,730,367 | A | | 9/1953 | Bublik | |
| 3,561,760 | A | * | 2/1971 | Klay | 473/563 |
| D244,790 | S | | 6/1977 | Carlson et al. | |
| 4,076,240 | A | | 2/1978 | Haddad | |
| 4,124,208 | A | * | 11/1978 | Burns | 473/562 |
| 5,150,896 | A | * | 9/1992 | Holmes | 473/530 |
| 5,160,135 | A | | 11/1992 | Hasegawa | |
| 5,407,195 | A | * | 4/1995 | Tiitola et al. | 473/563 |
| 5,429,352 | A | * | 7/1995 | Leclerc | 473/563 |
| 5,632,481 | A | * | 5/1997 | Unger et al. | 473/563 |
| 5,697,857 | A | * | 12/1997 | Christian et al. | 473/563 |
| 5,810,684 | A | * | 9/1998 | Ohman | 473/563 |
| 5,836,841 | A | | 11/1998 | Fell | |
| 5,839,977 | A | | 11/1998 | Maurer et al. | |
| 6,019,691 | A | * | 2/2000 | Hilborn | 473/563 |
| 6,257,999 | B1 | * | 7/2001 | Dahm | 473/563 |
| 6,626,775 | B2 | | 9/2003 | Tiitola | |
| 7,008,338 | B2 | | 3/2006 | Pearson | |

(Continued)

FOREIGN PATENT DOCUMENTS

| CH | 694284 A5 | 11/2004 |
|---|---|---|
| EP | 0 164 239 | 12/1985 |
| EP | 1 859 841 A1 | 11/2007 |
| WO | WO 02/34341 A1 | 5/2002 |

OTHER PUBLICATIONS

"Notification of Transmittal of the International Search Report and the Written Opinion of the International Searching Authority, or the Declaration" for International Application No. PCT/US2012/053743 mailed on Jan. 4, 2013.

(Continued)

*Primary Examiner* — Mark Graham
(74) *Attorney, Agent, or Firm* — Hamilton, Brook, Smith & Reynolds, P.C.

(57) ABSTRACT

A blade for a hockey stick which can readily absorb impact from the puck, and can allow the user to feel the puck on the blade in contrast to conventional carbon fiber blades. The blade can include a blade member integrally formed of composite material having discontinuous fibers bonded within thermosetting resin. The blade member can have a blade periphery surrounding a central blade region. The central blade region can have a plurality of openings arranged in a pattern to form series of elongate criss crossing ribs that extend between and connect different sides of the blade periphery to each other. The fibers in the blade periphery can be in a generally jumbled orientation, and the fibers in the central blade region can be positioned within the ribs in a manner wherein each rib contains a plurality of fibers that substantially extend in said each rib's elongate direction.

25 Claims, 12 Drawing Sheets

(56) References Cited

U.S. PATENT DOCUMENTS

| | | |
|---|---|---|
| 7,044,870 B2 | 5/2006 | Pagotto |
| 7,261,787 B2 | 8/2007 | Bellefleur et al. |
| 7,326,136 B2 | 2/2008 | Jean et al. |
| 7,329,195 B2 * | 2/2008 | Pearson ........................ 473/563 |
| 7,485,054 B2 | 2/2009 | Rigoli |
| 7,789,778 B2 | 9/2010 | Goldsmith et al. |
| 7,824,591 B2 | 11/2010 | Gans |
| 7,862,456 B2 | 1/2011 | Halko et al. |
| 2002/0177497 A1 | 11/2002 | Westerlund |
| 2003/0004019 A1 * | 1/2003 | Lussier et al. ................ 473/563 |
| 2003/0104883 A1 | 6/2003 | Caron |
| 2003/0162613 A1 | 8/2003 | Davis |
| 2005/0153799 A1 | 7/2005 | Rigoli |
| 2007/0281809 A1 * | 12/2007 | Garcia ........................ 473/560 |
| 2010/0108246 A1 | 5/2010 | Sanchez-Brunete Alvarez |
| 2011/0104413 A1 | 5/2011 | Mendibourne et al. |
| 2012/0244968 A1 * | 9/2012 | Jeanneau ...................... 473/561 |

OTHER PUBLICATIONS

Anonymous, "TPS Response XN10 Pro Stock One-Piece Composite Hockey Stick-Senior," Retrieved from the internet on Jun. 24, 2011, URL: http://www.hockeyworld.com/index/page/product/product_id/1561.

* cited by examiner

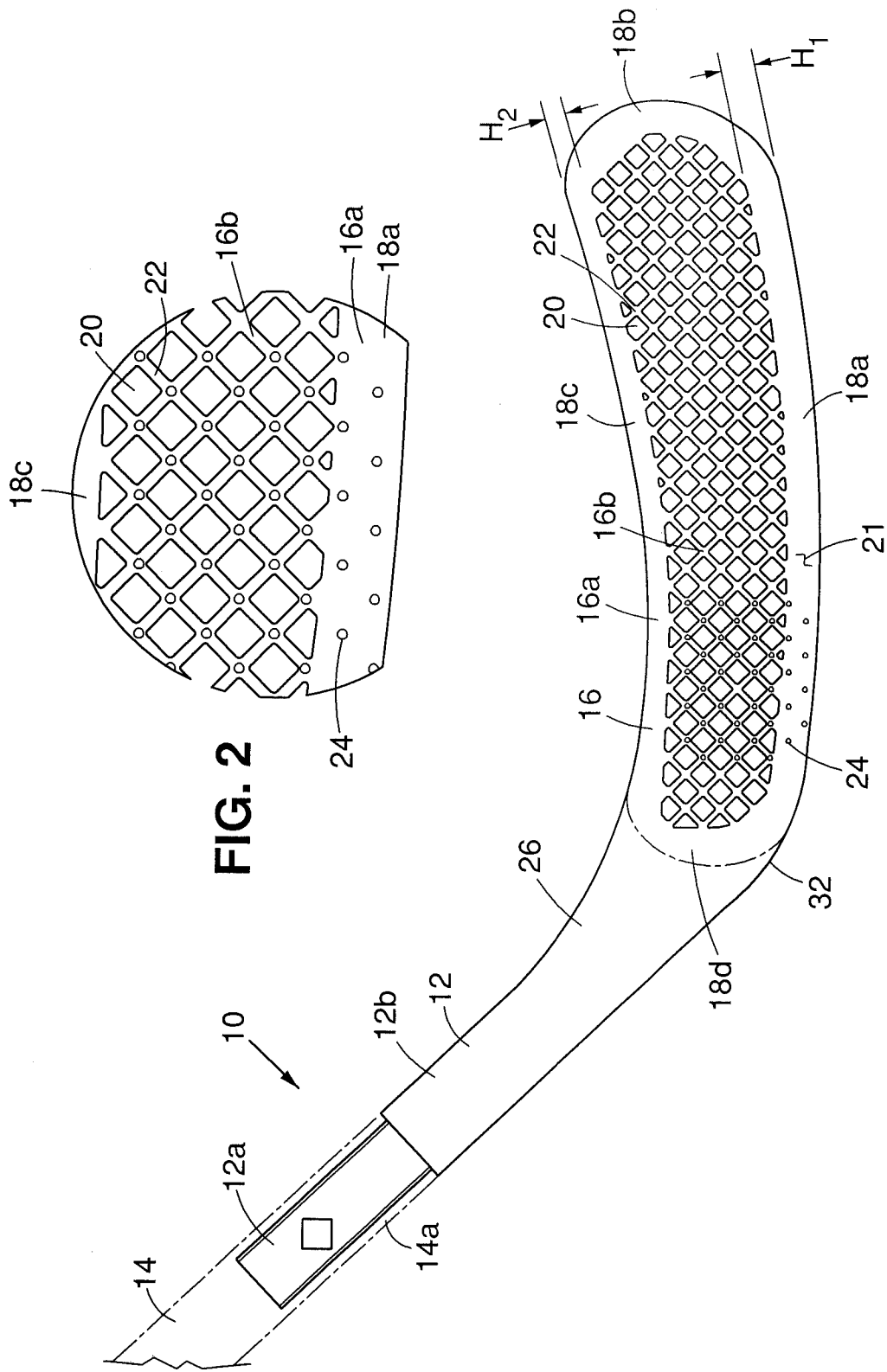

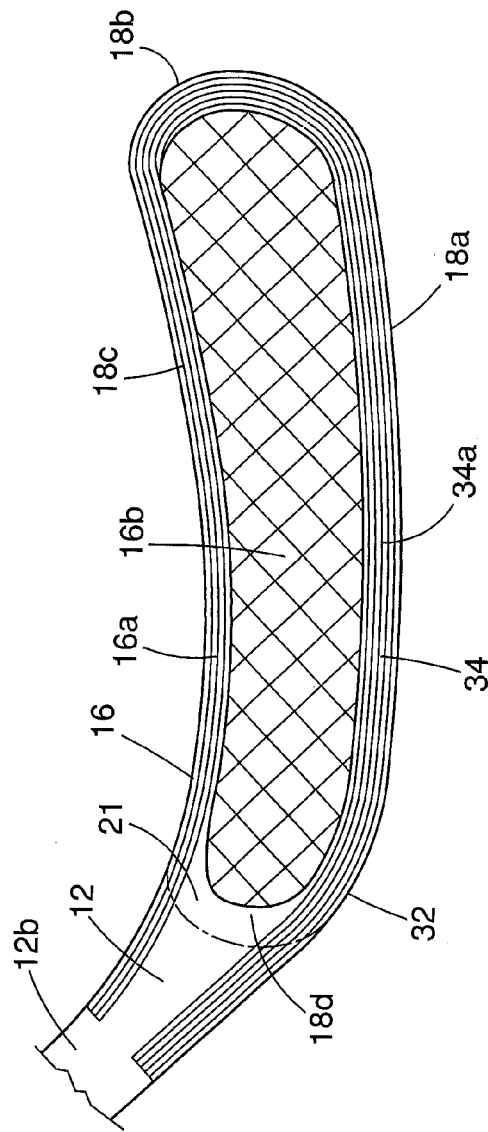
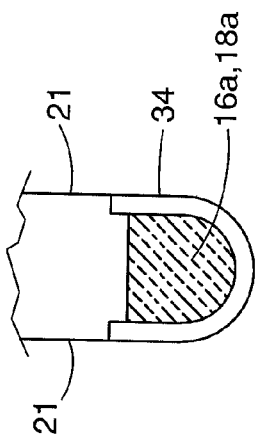
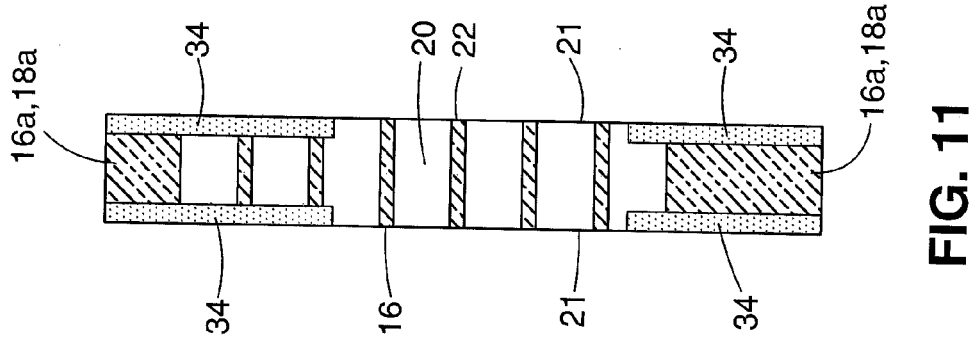

| Shot | Stick Made of Conventional Carbon Fiber | Present Invention Stick |
|---|---|---|
| 1 | 60 mph | 61 mph |
| 2 | 53 | 62 |
| 3 | 56 | 58 |
| 4 | 54 | 59 |
| 5 | 58 | 61 |
| 6 | 54 | 59 |
| 7 | 59 | 60 |
| 8 | 55 | 62 |
| 9 | 54 | 60 |
| 10 | 60 | 63 |
|  |  |  |
| Average | 56.3 | 60.5 |
| Difference |  | 7.5% |
| Max | 60 | 63 |
| Min | 53 | 58 |
| Variation +/- | 6.19% | 4.13% |

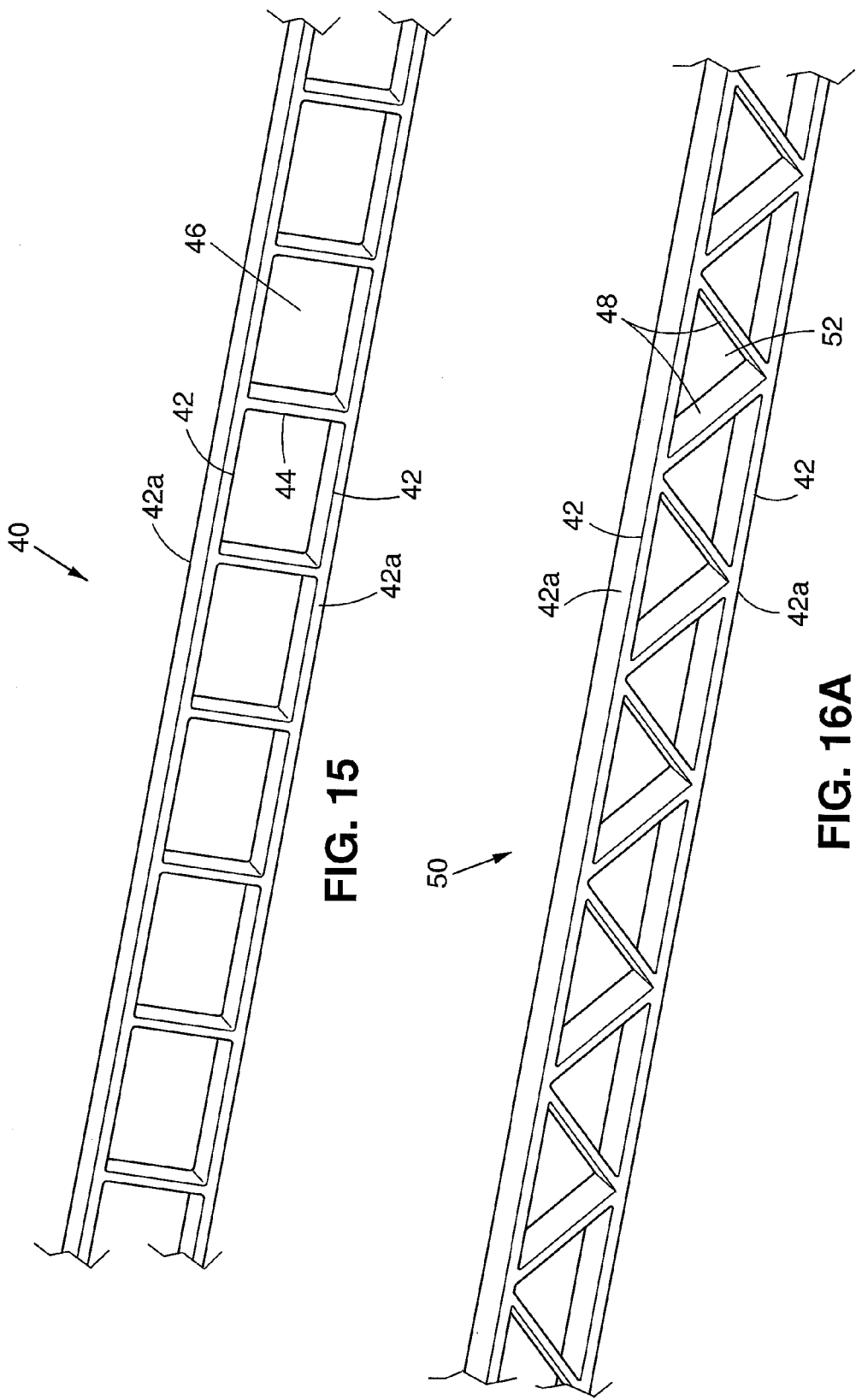

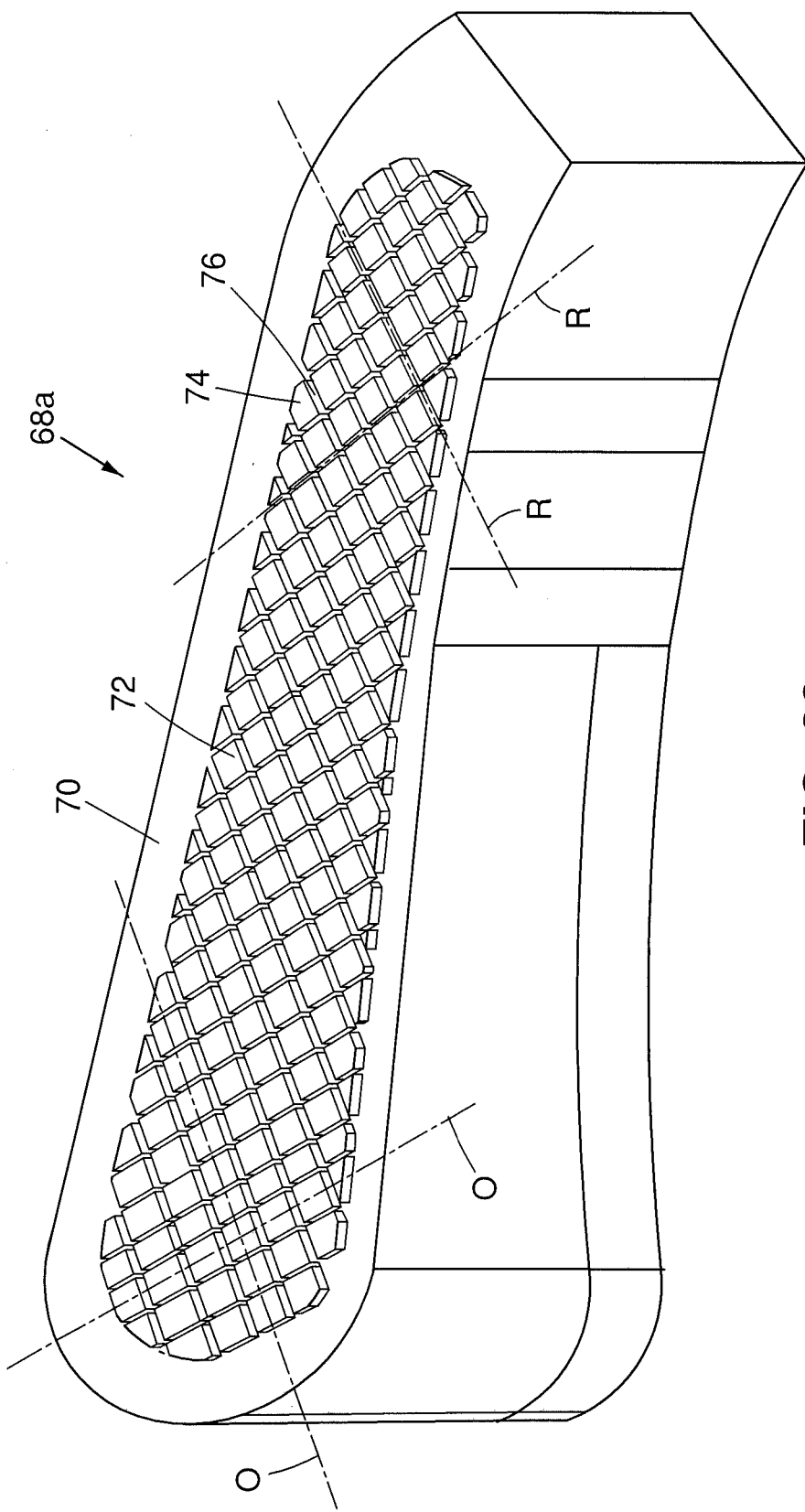

ial pattern relative to the blade member to form a series of criss crossing elongate diagonal ribs. The openings can be rectangular openings that are each oriented at an angle as a diamond shape. The fibers can be about 1-3 inches long, and can be selected from the group consisting of carbon fiber, glass fiber
HOCKEY STICK

BACKGROUND

Hockey stick blades typically are formed from a core such as wood or foam that is wrapped with cloth having reinforcing fibers, such as fiberglass or carbon fibers, and bonded in resin. Such a design is susceptible to delamination as the blade wears during use, resulting in breakage. In addition, with carbon fiber cloth reinforced blades, the high stiffness of the bonded carbon fiber prevents impact absorption when stick handling a hockey puck. Such high stiffness typically causes the puck to easily bounce off the blade, reducing the ability of the user to feel and sense when and where the puck is on the blade without looking, which is most of the time during a play.

SUMMARY

The present invention can provide a blade for a hockey stick which can readily absorb impact from the puck, and can allow the user to feel the puck on the blade in contrast to conventional carbon fiber blades. The blade can include a blade member integrally formed of composite material having discontinuous fibers bonded within thermosetting resin. The blade member can have a blade periphery surrounding a central blade region. The central blade region can have a plurality of openings arranged in a pattern to form series of elongate criss crossing ribs that extend between and connect different sides of the blade periphery to each other. The fibers in the blade periphery can be in a generally jumbled orientation, and the fibers in the central blade region can be positioned within the ribs in a manner wherein each rib contains a plurality of fibers that substantially extend in said each rib's elongate direction.

In particular embodiments, the plurality of openings in the central blade region can be arranged in a diagonal pattern relative to the blade member to form a series of criss crossing elongate diagonal ribs. The openings can be rectangular openings that are each oriented at an angle as a diamond shape. The fibers can be about 1-3 inches long, and can be selected from the group consisting of carbon fiber, glass fiber and aramid fiber. The blade member can have opposite front and rear blade faces. At least a portion of the blade periphery can have a layer of unidirectional fibers laminated thereon, on at least one of the front and rear blade faces. The blade member can include a series of spaced raised protrusions on at least a front blade face. The raised protrusions can extend about 0.04 inches, and can be spaced about ⅛ to ¼ inches apart from each other. The blade member can be formed from a sheet of prepregnated composite material. About 33% to 63% of the central blade region can be open area formed by the plurality of openings.

The present invention can also provide a blade for a hockey stick including a blade member integrally formed of composite material having discontinuous carbon fibers bonded within thermosetting resin. The blade member can have a blade periphery surrounding a central blade region. The central blade region can have a plurality of openings arranged in a diagonal pattern relative to the blade member to form a series of elongate criss crossing diagonal ribs that extend between and connect different sides of the blade periphery to each other. The fibers of the blade periphery can be in a generally jumbled orientation, and the fibers in the central blade region can be positioned within the ribs in a manner wherein each rib contains a plurality of fibers that substantially extend into each rib's elongate direction.

The present invention can also provide a hockey stick having a blade including a blade member integrally formed of composite material having discontinuous carbon fibers bonded within thermosetting resin. The blade member can have a blade periphery surrounding a central blade region. The central blade region can have a plurality of openings arranged in a pattern to form a series of elongate criss crossing ribs that extend between and connect different sides of the blade periphery to each other. The fibers in the blade periphery can be in a generally jumbled orientation, and the fibers in the central blade region can be positioned within the ribs in a manner wherein each rib contains a plurality of fibers that substantially extend in each rib's elongate direction. A shaft can be connected to the blade.

The present invention can also provide a shaft for a hockey stick including first and second elongate edges spaced apart from each other. A series of regularly spaced connecting members can extend between and connect the first and second elongate edges to each other in a truss-like configuration. The elongate edges and the connecting members can be integrally formed together from composite material having fibers bonded within thermosetting resin.

In particular embodiments, the connecting members can be connected to the first and second edges at right angles. In one embodiment, the first and second edges can include two parallel spaced apart elongate members. In another embodiment, the connecting members can be connected to the first and second edges at angles in a zig zag pattern.

The present invention can also provide a mold for molding a blade for a hockey stick including a first mold half having a first blade periphery cavity half surrounding a first central region. A second mold half having a second blade periphery cavity half can surround a second central region. At least one of the first and second central regions can have a plurality of raised protrusions arranged in a pattern. The first and second mold halves can join together under pressure for compression molding prepregnated composite material. The first and second mold halves can combine to form a completed blade periphery mold cavity surrounding a completed central region in which the plurality of the raised protrusions arranged in the pattern form a series of criss crossing cavities that extend between and connect different sides of the completed blade periphery mold cavity to each other. The raised protrusions can substantially align a plurality of fibers in the composite material with the criss crossing cavities while the fibers remain unaligned in the completed blade periphery mold cavity.

In particular embodiments, the first central region can have a plurality of first raised protrusions arranged in a first pattern and the second central region can have a plurality of second raised protrusions arranged in a second pattern. The plurality of the first and second raised protrusions in the first and second patterns can respectively align with each other.

The present invention can also provide a method for forming a blade for a hockey stick including integrally forming a blade member from composite material having discontinuous fibers within thermosetting resin to have a blade periphery surrounding a central blade region. The central blade region can have a plurality of openings arranged in a pattern to form a series of elongate criss crossing ribs that extend between and connect different sides of the blade periphery to each other. The blade periphery can be formed in a manner in which the fibers are in a generally jumbled orientation. The fibers in the central blade region can be oriented within the ribs in a manner wherein each rib contains a plurality of fibers that substantially extend in said each rib's elongate direction.

In particular embodiments, the blade member can be formed from a sheet of prepregnated composite material. The sheet of prepregnated composite material can be molded in a mold and the plurality of openings in the central blade region can be formed with mold protrusion members. The mold protrusion members can also position and orient the fibers within the ribs. The plurality of the openings in the central blade region can be formed in a diamond pattern relative to the blade member, thereby forming a series of elongate criss crossing diagonal ribs. The openings can be formed as rectangular openings that are each oriented at an angle as a diamond shape. The blade member can be formed from composite material having fibers about 1-3 inches, and the fibers can be selected from the group consisting of carbon fiber, glass fiber and aramid fiber. A layer of unidirectional fibers can be laminated on at least a portion of the blade periphery, and on at least one of front and rear blade faces of the blade member. A series of spaced raised protrusions can be formed on at least a front blade face. The raised protrusions can be formed to extend about 0.04 inches, and about ⅛-¼ inches apart from each other. The central blade region can be formed with about 33%-63% open area, with the plurality of openings.

The present invention can also provide a method of forming a blade for a hockey stick including integrally forming a blade member from composite material having discontinuous carbon fibers within thermosetting resin to have a blade periphery surrounding a central blade region. The central blade region can have a plurality of openings arranged in a diagonal pattern relative to the blade member to form a series of elongate criss crossing diagonal ribs that extend between and connect different sides of the blade periphery to each other. The blade periphery can be formed in which the fibers are in a generally jumbled orientation. The fibers in the central blade region can be oriented within the ribs in a manner wherein each rib contains a plurality of fibers that substantially extend in each rib's elongate direction.

The present invention can also provide a method of forming a hockey stick including integrally forming a blade member of a blade from composite material having discontinuous fibers within thermosetting resin to have a blade periphery surrounding a central blade region. The central blade region can have a plurality of openings arranged in a pattern to form a series of elongate criss crossing ribs that extend between and connect different sides of the blade periphery to each other. The blade periphery can be formed in which the fibers are in a generally jumbled orientation. The fibers in the central blade region can be oriented within the ribs in a manner wherein each rib contains a plurality of fibers that substantially extend in each rib's elongate direction. A shaft can be connected to the blade.

The present invention can also provide a method of forming a shaft for a hockey stick including spacing first and second elongate edges away from each other. The first and second elongate edges can be connected to each other in a truss-like configuration with a series of regularly spaced connecting members extending therebetween. The elongate edges and the connecting members can be integrally formed together from composite material including fibers bonded within thermosetting resin.

In particular embodiments, the connecting members can connect to the first and second edges at right angles. In one embodiment, the first and second edges can be formed from two parallel spaced apart elongate members. In another embodiment, the connecting members can be connected to the first and second edges at angles in a zig zag pattern.

The present invention can also provide a method of molding a blade for a hockey stick including providing a first mold half having a first blade periphery cavity half surrounding a first central region. A second mold half can have a second blade periphery cavity half surrounding a second central region. At least one of the first and second central regions can have a plurality of raised protrusions arranged in a pattern. The first and second mold halves can be joined under pressure and can compression mold prepregnated composite material therebetween. The first and second mold halves can be combined to form a completed blade periphery mold cavity surrounding a completed central region in which the plurality of the raised protrusions arranged in the pattern can form a series of criss crossing cavities that extend between and connect different sides of the completed blade periphery mold cavity to each other. The raised protrusions can substantially align a plurality of fibers in the composite material with the criss crossing cavities while the fibers remain unaligned in the completed blade periphery mold cavity.

In particular embodiments, the first central region can have a plurality of first raised protrusions arranged in a first pattern and the second central region can have a plurality of second raised protrusions arranged in a second pattern. The plurality of the first and second raised protrusions in the first and second patterns can be respectively aligned with each other.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a front view of an embodiment of a hockey stick in the present invention.

FIG. 2 is an enlarged view of a portion of the blade of the hockey stick of FIG. 1.

FIG. 10 is a front schematic view of still another embodiment of a blade in the present invention.

FIG. 11 is a sectional view of the blade in FIG. 10.

FIG. 12 is a sectional view of the bottom of another embodiment of a blade.

FIG. 15 is a perspective view of a portion of an embodiment of a shaft of a hockey stick in the present invention.

FIG. 16A is a perspective view of another embodiment of a shaft.

FIG. 20 is a schematic perspective view of an embodiment of a mold insert for one mold half.

DETAILED DESCRIPTION

Figure 3:
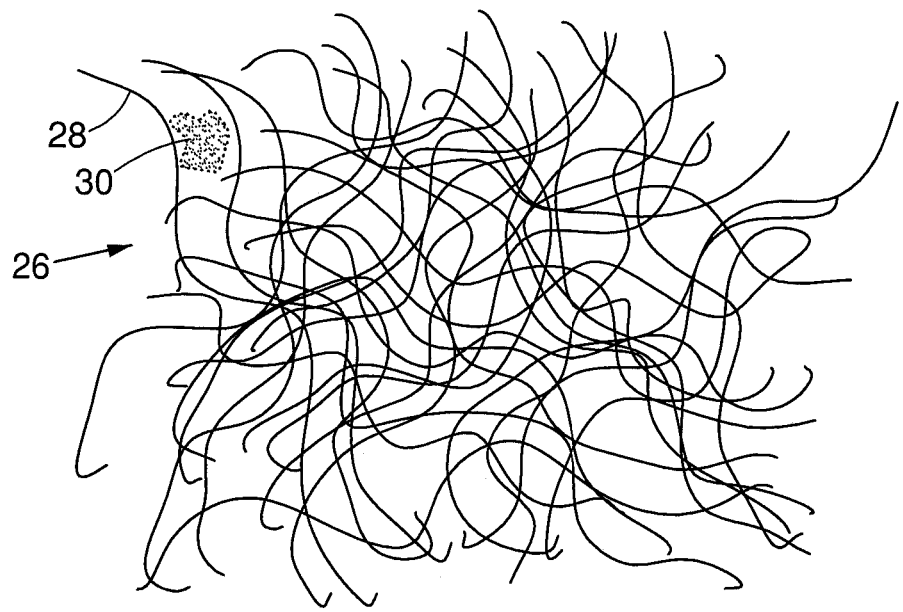
FIG. 3 is a schematic drawing of an embodiment of the composite material in the blade periphery of the blade.

Referring to FIGS. 1-5, hockey stick 10 can include a hockey stick paddle or blade 12 that is connected to a hockey stick shaft 14. The blade 12 can have a paddle or blade portion or member 16 and a transition area or region 12b extending at an angle therefrom, where the shape of the blade 12 narrows or transitions from the blade member 16 into a shaft-like shape. In some embodiments, the blade 12 can have a connecting or securement member, post, protrusion or extension 12a, extending from transition region 12b, that can be inserted or extended into a corresponding connecting or securement cavity, hole or opening 14a in the shaft 14 for securement thereto, in a manner as known in the art. The shaft 14 can be a standard shaft, or can be specifically made for blade member 16. The securement member 12a and the opening 14a can each have rectangular cross sections. In some embodiments, the blade 12 and shaft 14 can be integrally formed together. The blade 12 can be straight, or curved to one side or the other for left handed or right handed players.

The blade member 16 and transition region 12b can be integrally formed together in one piece from composite material 26, which can be solid and have relatively short chopped discontinuous fibers 28 bonded within a resin 30 such as a thermosetting resin (FIG. 3). In one embodiment, the fibers 28 can be carbon fibers that are bonded within thermosetting resin 30 such as vinyl ester, which can provide high strength blade 12 that is light weight. In other embodiments, the fibers 28 can be other suitable fibers such as fiberglass, aramid, boron, etc., and other suitable thermosetting resins 30 can be used such as polyester, epoxy, phenolic polyamide, etc. In other embodiments, other polymeric resins or materials can be used, including thermoplastic resins, such as nylon, ABS, polycarbonate, etc.

Figure 5:
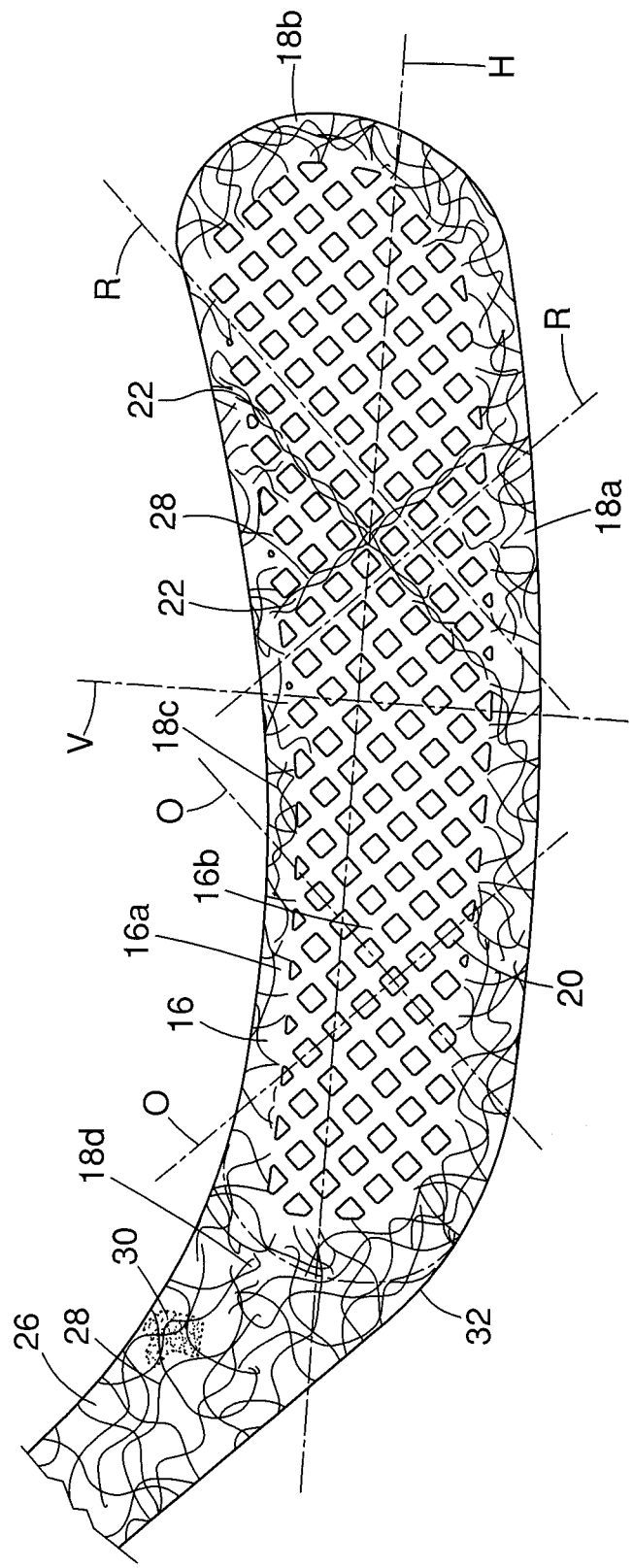
FIG. 5 is a front schematic of a blade showing fiber orientation.

The blade member 16 can have a blade periphery, ring or rim 16a encircling, extending around or surrounding an inner or central blade region or area 16b. The blade periphery 16a and the central blade region 16b can be generally elongated in shape, extending laterally along the blade member 16 generally in the direction of lateral or horizontal axis H (FIG. 5). The blade periphery 16a can have an elongate generally lateral lower or bottom portion, edge or side 18a, an upwardly extending or upright slightly rounded or curved distal toe portion, end, edge or side 18b, an elongate generally lateral top or upper portion, edge or side 18c, and an upright or upwardly extending proximal heel portion, end or side 18d, that are connected together around the central blade region 16b in a relatively narrow or thin perimeter rim or ring.

The central blade region 16b can have a plurality of regularly or evenly spaced apertures, holes or openings 20 extending laterally therethrough between front and rear faces 21 that are arranged along axes O in a grid-like or matrix pattern, to form a series of narrow elongate regularly or evenly spaced integrally connected criss crossing or intersecting ribs 22 that extend along axes R between and integrally connect different portions or sides of the blade periphery 16a in a generally regularly or evenly spaced grid-like, matrix-like or net-like manner. The openings 20 and ribs 22 can be angled relative to the blade member 16, for example about 45° relative to vertical axis V or horizontal axis H, to form a plurality or series of angled regularly or evenly spaced integrally connected criss crossing ribs 22 extending between and integrally connecting the bottom portion 18a to portions 18b, 18c and 18d, and extending between and integrally connecting top portion 18c with portions 18d, 18a and 18b, and form a stiff resilient net. In one embodiment, the openings 20 can be rectangular or square, and oriented to be diamond shaped, and arranged or oriented in a diamond pattern at 45°. Such openings 20 and angled criss crossing ribs 22 can provide a blade member 16 that is light weight with reduced wind resistance while at the same time has a configuration that is strong and has strength against torsional stresses exerted on the blade member 16. A series of spaced protrusions, knobs or nubs 24 can be positioned on the blade periphery 16a and central blade region 16b of one or both of the front and rear faces 21 of the blade 12 or blade member 16, which can frictionally or penetratably grip a hockey puck during stick handling for improved control. The front and rear faces 21 can be identical for a straight blade 12, and for a curve blade 12, the front face 21 can be concave, and the rear face 21 can be convex. In some embodiments, the openings 20 and ribs 22 do not have to be equally spaced or sized.

Figure 6:
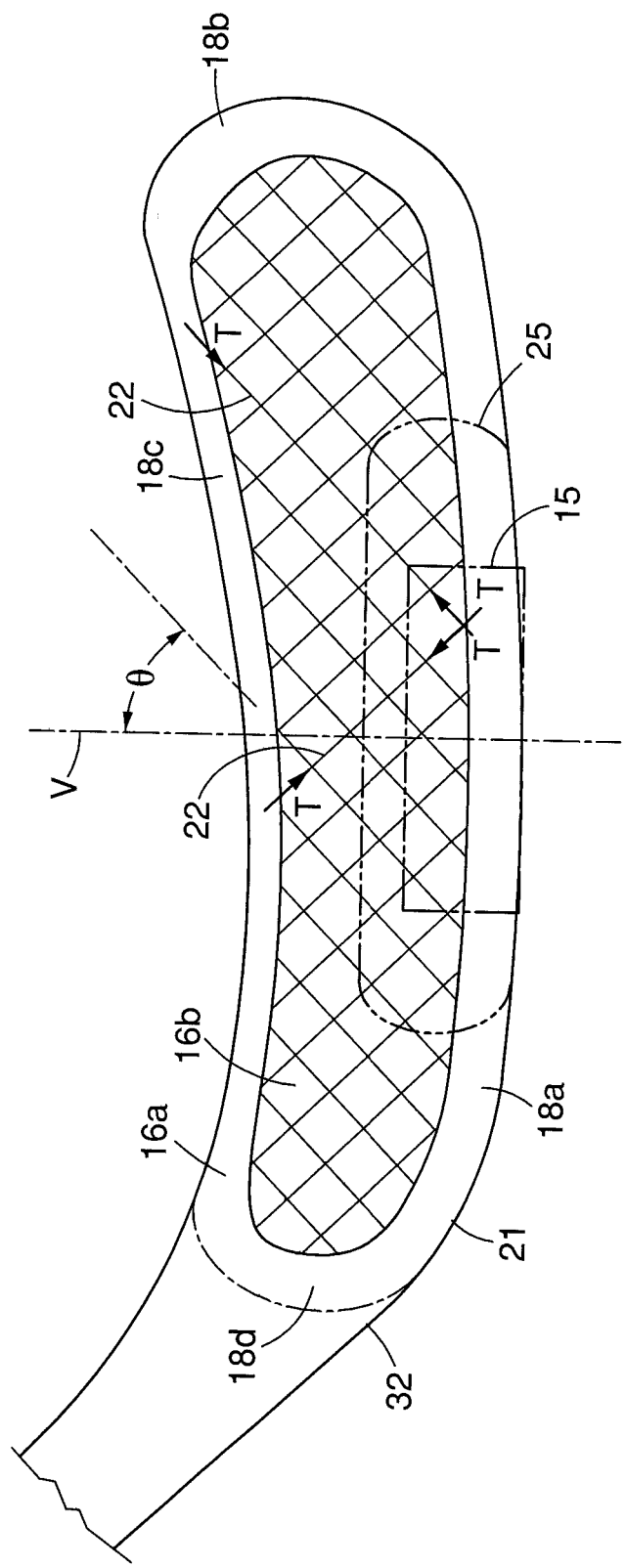
FIG. 6 is a simplified front schematic view of a blade striking a hockey puck.

The fibers 28 of the composite material 26 in the blade periphery 16a, heel 32, blade transition region 12b and securement member 12a, can be generally jumbled, amorphous, scrambled, mixed, multi or non directional, circuitous or bent (FIG. 3), within resin 30, while the fibers 28 in the resin 30 of the composite material 26 in the central blade region 16b within the integrally connected ribs 22 are directed to extend substantially or generally in the longitudinal or elongate direction of the ribs 22 and their axes R. Some fibers 28 in the ribs 22 can have portions that bend or curve around openings 20 to extend along a rib 22. As a result, each rib 22 can contain a plurality of fibers 28 that substantially extend in the rib's 22 elongate or longitudinal direction (FIG. 4), resulting in a high bending or tensile strength along axes R for each rib 22. Referring to FIGS. 5 and 6, the blade periphery 16a and the central blade region 16b, formed of composite material 26 having integrally connected regions with amorphous fibers 28 and generally aligned fibers 28, respectively, can provide a ring of amorphous composite material 26 surrounding and integrally connecting to generally aligned fibers 28 in criss crossing ribs 22 of the central blade region 16b, which have longitudinal strength along axes R due to the aligned fibers 28. This can form a high strength central blade region 16b, and by having angled ribs 22, can provide high torsional strength to the blade member 16 despite the openings 20 providing a large percentage open area. The composite material 26 in the blade periphery 16a and the ribs 22 can be solid in the z direction or generally across the thickness or width of the blade member 16 between the front and rear faces 21.

When striking a hockey puck 15, the ribs 22 can each be resiliently loaded in tension T along the longitudinal lengths and axes R of the ribs 22 that connect the different sides of the blade periphery 16a to each other, which can help propel the puck 15. The ribs 22 can form resilient strings or members secured or strung in a frame, such as in a tennis racket, which can be resilient deflected or loaded for generating power to aid in propelling the hockey puck 15, such as during a slap shot. The tennis racket effect for generating power can also increase the size of the effective sweet spot 25 for shooting the puck 15 with consistent speed or velocity, so that the puck 15 does not have to be struck on an exact particular spot for consistency. The center of the sweet spot 25, for example, can be at the central location along vertical axis V with the sweet spot 25 extending over a surrounding area. The openings 20 in the central blade region 16b decrease the weight of the blade 12, and provide less wind resistance for swinging the stick 10 during a slap shot, such that the blade 12 can be swung at higher velocity. In addition, since the blade member 16 is integrally formed into a solid integral piece, all the fibers 28 in the composite material 26 can be consistently completely immersed in the resin 30 and bonded to remain in an exact position, even under loading. Consistently completely immersing the fibers 28 in the resin 30 can allow all the fibers 28 in the blade member 16 to be simultaneously, instantly and quickly loaded for optimum, maximum quick efficient energy transfer, force and acceleration to the puck 15, and have optimum fatigue capability.

Figure 7:
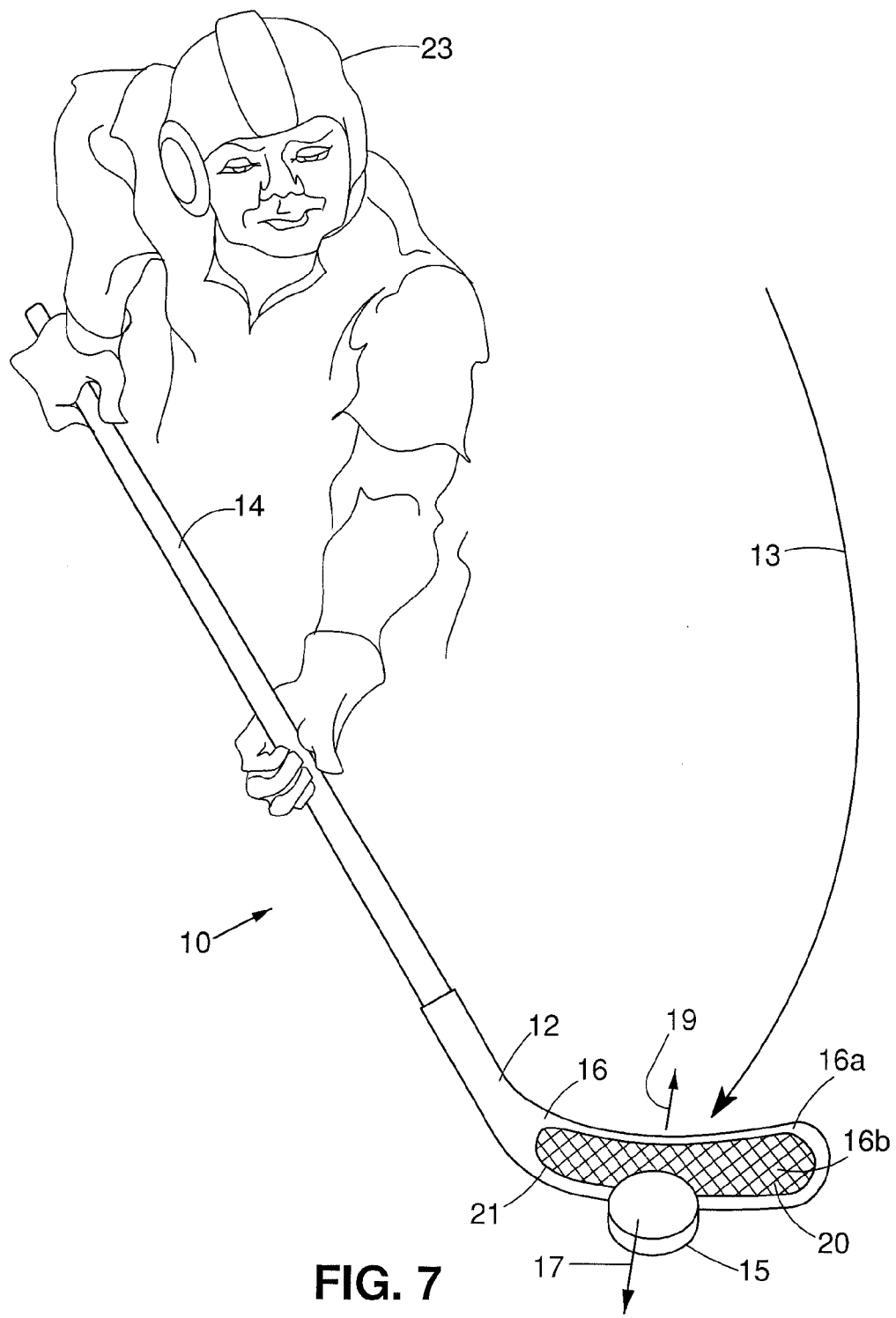
FIG. 7 is a schematic drawing of an embodiment of a hockey stick in the present invention striking a hockey puck.

Consequently in use, referring to FIG. 7, when striking a hockey puck during a slap shot, the blade 12 of the hockey stick 10 is swung along a path 13. The large number of openings 20 in the central blade region 16b makes the blade 12 light in weight, and allows air 19 to pass through to provide less wind resistance while being swung. This can allow the blade 12 to be swung at a higher velocity along path 13, thereby striking the puck at a higher velocity than a typical prior art stick, which can increase the velocity of a shot. Striking the puck at higher speeds also requires the blade 12 to be stronger than in slower prior art sticks. When the blade 12 strikes the puck 15, the criss crossing diagonal ribs 12 connected to the interior of the blade periphery 16a can provide a tennis racket effect and generate additional resilient power for striking and propelling the puck 15 in the direction of arrow 17, which can additionally increase the velocity of the shot. The completely immersed and bonded fibers 28 allow the blade 12 to instantly transfer energy, force and acceleration to the puck 15, which can further increase the velocity of the shot. In some embodiments, an increase of about 5 mph for an average player in a slap shot can be obtained over prior art sticks. As previously mentioned, the configuration of the ribs 22 in the central blade region 16b can increase the size of the sweet spot 25 of the blade member 16 for consistently shooting a puck 15 with a consistent maximum velocity despite not striking the puck 15 at the exact center of the sweet spot 25. The solid blade periphery 16a, with the bottom portion 18a having a height $H_1$ that is higher than the height $H_2$ of the top portion 18b, and the solid heel 32 and transition region 12b, positions more of the mass or weight of the blade 12 near the bottom of the blade 12, which not only can contribute to the larger sweet spot 25, but can also strike the puck 15 with more force and provide a more dynamically balanced apparatus during the shot which ensures more consistency in speed and direction. A more dynamically balanced apparatus also provides a more stable shaft during play which further improves the players ability. The bottom portion 18a can be also slightly thicker than the top portion 18b.

Additionally, by having short discontinuous, amorphous scrambled or jumbled fibers 28 within the resin 30 in the blade periphery 16a, heel 32 and transition region 12b, the fibers 28 do not readily transmit vibrations along the length of the blade 12, since the ends of each short fiber 28 terminate within the resin 30, which can dampen the vibrations rather than readily propagating the vibrations. Vibrations propagated along the ribs 22 within the central blade region 16b can be dampened by the integrally connected blade periphery 16a surrounding the central blade region 16b in a ring. The short scrambled fibers 28 can transmit vibrations only a short distance within the blade 12 before being dampened by the surrounding resin 30. With the scrambled fibers 28 extending in all directions, x, y and z directions, the vibrations can be dispersed in all directions and then dampened. By spreading out the vibrations in all directions, the dispersed vibrations can be more readily dampened by the surrounding resin 30. Such vibration dampening of the blade periphery 16a, heel 32 and transition region 12b, can also contribute to a larger sweet spot 25. The solid bottom portion 18a of the blade periphery is also wear resistant in comparison with prior art blades, which have a thin outer laminated fiber cloth layer that typically quickly wears, frays and delaminates. In addition, by being solid in the z direction or thickness of the blade member 16, the blade member 16 can be strong in the z direction, in comparison to blades in the prior art that have layers of laminated cloth.

The vibration dampening effect of the short scrambled amorphous fibers 28 in the blade periphery 16a, heel 32 and transition region 12b, also allows the user 23 to better control and feel the puck 15 during stick handling and receiving passes, in a manner similar to wooden blades. Embodiments of blade 12 can have a modulus of elasticity of about 7,000,000 psi. In conventional carbon fiber blades, the carbon fibers are typically long fibers which can extend on the outer surface of the blade, the length or height of the blade, or both. This results in a very stiff higher modulus outer blade surface in which the long fibers readily transmit vibrations the length of the blade, such that the puck has a tendency to uncontrollably bounce off the blade when receiving passes and stick handling in contrast to wooden blades, and blades in the present invention. The high modulus surface typically prevents impact absorption when the puck hits it, and the puck bounces off the blade easily. This bounce off the blade reduces the ability of the user to sense or feel when and where the puck is on the blade without looking. In the blade 12 of the present invention, the vibration dampening effect of the scrambled amorphous fibers 28 allows for impact absorption when the puck 15 strikes the blade 12, and also dampens vibrations travelling along the length of the blade 12. This provides less bounce off the blade 12 than in conventional carbon fiber sticks and gives the user 23 a much better feel or sense of when and where the puck 15 is on the blade 12. In addition, the protrusions 24 on the face 21 of the blade 12 and blade member 16 when tactilely engaging and gripping the surface of the puck 15, can also contribute to the user's 23 feel for the puck 15. The edges of the ribs 22 can additionally tactilely engage and grip the surface of the puck 15 for further contributing to the user's 23 feel for the puck 15. The tactile gripping of the puck 15 by these surfaces on the face 21 of the blade 12, allows the blade 12 to be used without hockey tape wrapped around the blade 12, if desired. The integral construction of the blade member 16 allows the blade 12 to be heated and bent so that each user 23 can tailor the curve of the blade 12 to his preference. Although the resin 30 is typically thermosetting resin, heating and bending is possible.

In one embodiment of FIG. 1, the composite material 26 can have carbon fibers 28 that are about 1-3 inches long and bonded within vinyl ester. The length of the blade 12 from portion 18b to 18d can be around 11 inches, and the height of the blade can be about 2½ inches close to the heel 32, and about 3 inches near portion 18b. The bottom or lower portion 18a of the blade periphery 16a can have a height $H_1$ of about ½ and a thickness of about ¼ of an inch near portion 18d and tapering to a thickness of about 0.23 inches at the central location of axis V and about 0.15 inches at portion 18b. The top or upper portion 18c of the blade periphery 16a can have a height of about 0.3 inches and can have a thickness of about ¼ inch near portion 18d and tapering to a thickness of about 0.2 inches at axis V and about 0.14 inches at portion 18b. The central blade region 16b can have a thickness which matches and tapers with the adjoining portions 18a, 18b, 18c and 18d of the blade periphery 16a, to provide faces 21 with continuously connected surfaces. The protrusions 24 can be about 0.040 to 0.050 inches in diameter and protrude about 0.040 inches from the faces 21. The openings 20 can be about ¼ inch square or 0.254×0.254 inches square, and can have corners with a slight radius, such as 0.033 inches, for reducing stress concentrations. The ribs 22 can be about 0.10 inches or 0.098 inches wide. The central blade region 16b can be about 10 inches long, with a height about 1½ inches close to the heel 32 and about 2¼ inches near portion 18b. Such openings 20 and ribs 22 can provide about 52% open area for the central blade region 16b, and about 32% open area for the combined area of the central blade region 16b and the blade periphery 16a. The width or size of the openings 20 to the width of the ribs can be about a 2.6 to 1 ratio. The blade 12 can be used with openings 20 exposed or alternatively, can be covered with hockey tape or a thin light weight skin. In some embodiments, one face of the blade 12 can be formed with a smooth face, with the openings 20 and ribs 22 being seen on the opposite face.

Figure 8:
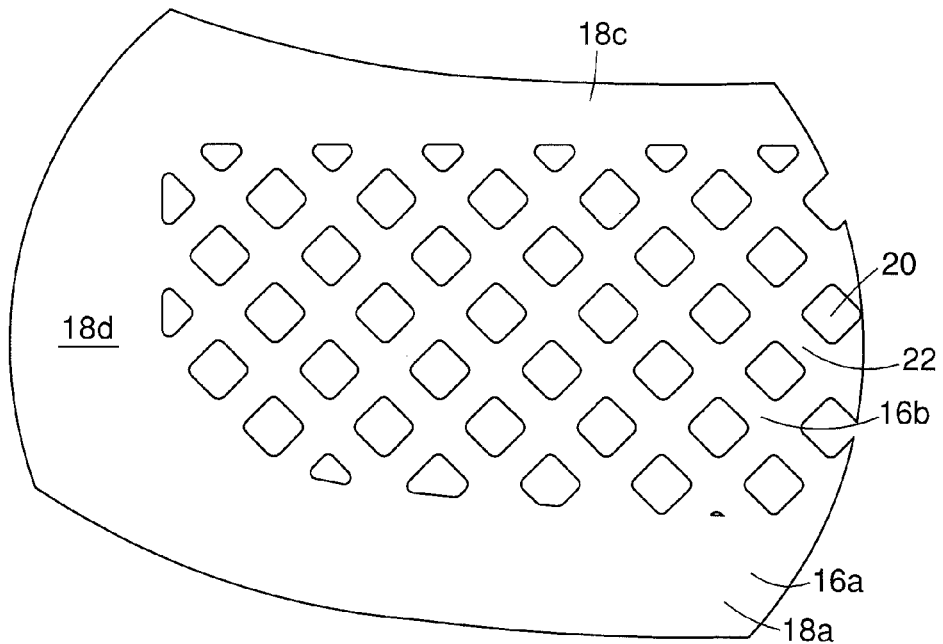
FIG. 8 is an enlarged view of a portion of another embodiment of a blade in the present invention.

In another embodiment, referring to FIG. 8, the openings 20 can be about 0.204×0.204 inches square, and the ribs can be about 0.15 inches wide. Such openings 20 and ribs 22 can provide about 33% open area for the central blade region 16b, and about 20% open area for the combined area of the central blade region 16b and the blade periphery 16a. The width or size of the openings 20 to the width of the ribs 22 can be about a 1.4 to 1 ratio.

Figure 9:
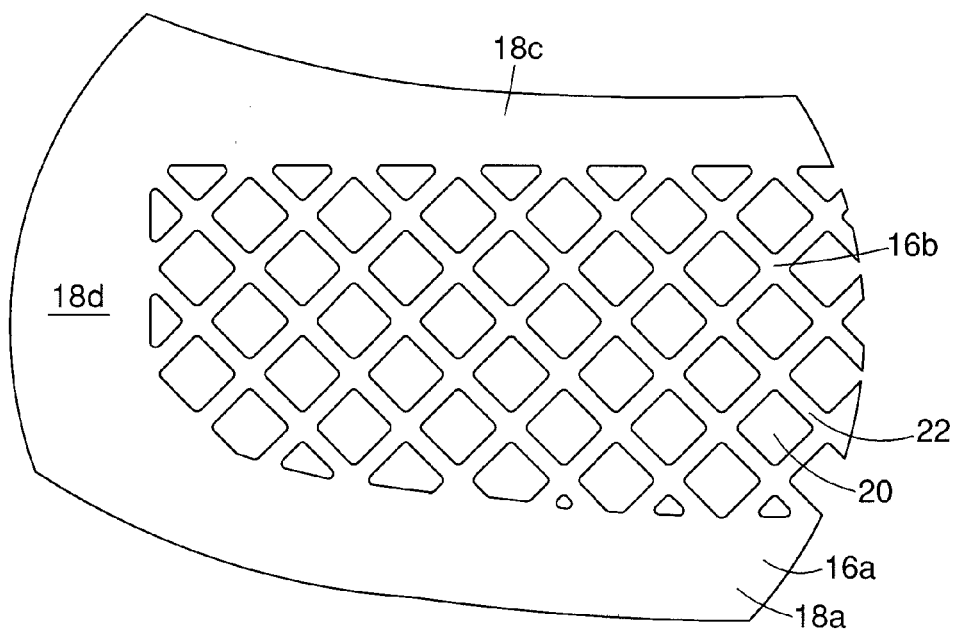
FIG. 9 is an enlarged view of a portion of yet another embodiment of a blade in the present invention.

In another embodiment, referring to FIG. 9, the openings 20 can be about 0.281×0.281 inches square, and the ribs 22 can be about 0.073 wide. Such openings 20 and ribs 22 can provide about 63% open area for the central blade region 16b, and about 39% open area for the combined area of the central blade region 16b and the blade periphery 16a. The width or size of the openings 20 to the width of the ribs 22 can be about a 3.8 to 1 ratio. In other embodiments, the openings 20 do not have to be squares that are oriented at 45° to form diamonds in a diamond pattern, but can be oriented at other angles between 30° and 60° and can be other shapes including round holes, or other suitable polygonal shapes including rectangles, hexagons and octagons. In some embodiments, the holes 20 and the ribs 22 can be arranged to provide vertical and horizontal ribs 22.

Referring to FIGS. 10 and 11, in another embodiment, thin layers or laminates 34 having elongate or long unidirectional or parallel fibers 34a can be bonded to portions of the blade periphery 16a on one or both faces 21 of the blade member 16 to increase strength of the blade 12. Fibers 34a can be the same material as fibers 28, and can be carbon fiber, glass fiber, aramid fiber and boron fiber. The laminates 34 can extend along a substantial portion of the blade periphery 16a, such as along the bottom portion 18a and the top portion 18b. As shown in FIG. 10, the laminates 34 can start in the hosel area, extend around heel portion 18d, along the bottom portion 18a, around the toe portion 18b and back along the top portion 18c, past heel portion 18d up into the hosel area. This can form a thin U-shaped beam, which can increase the vertical strength as well as the lateral strength of blade 12. In one embodiment, the fibers 34a can be carbon fiber, and the laminates 34 can be formed from a ribbon 1 inch wide. The laminates 34 can have a height slightly higher than the bottom 18a and top portions 18b, overlapping into the central blade region 16b, and can be incorporated into the ribs 22, as shown in FIG. 11. In some embodiments, two laminates 34 can be bonded to opposite faces 21 of the blade member 16. In another embodiment, a single laminate 34 can be laminated, which can be wrapped around both faces 21 of the portions 18a, 18b and 18c to form a generally U-shaped cross section, as shown in FIG. 12.

Figures 13, 14:
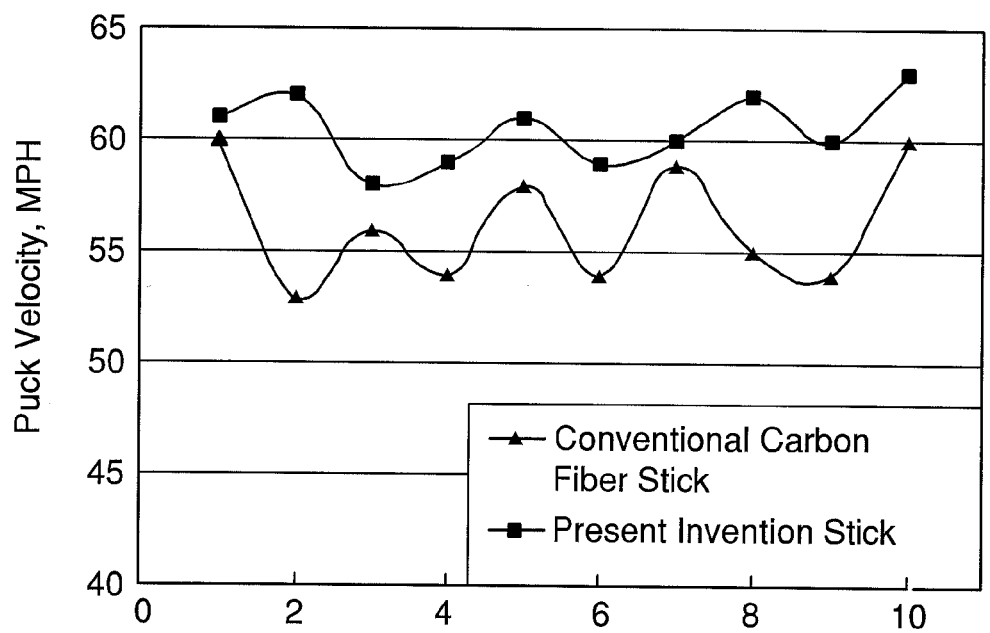
FIG. 13 is a chart comparing test results between a conventional carbon fiber stick and the present invention.
FIG. 14 is a graph depicting the test results of FIG. 13.

A stick 10 having an embodiment of FIG. 10 with a blade member 16 as in FIG. 1, having openings 20 that are 0.254×0.254 inches square and ribs 22 that are 0.98 inches wide, was tested by a recreational hockey player with 10 slap shots and compared with 10 slap shots taken with a conventional carbon fiber hockey stick made by Easton. As shown in FIGS. 13 and 14, the average speed of a slap shot taken with a conventional carbon fiber stick was 56.3 mph, with the fastest shot being 60 mph, the slowest 53 mph, resulting in a variation of 7 mph or 6.19%. In contrast the average speed of a slap shot taken with the embodiment of the present invention stick 10 was 60.5 mph, which is an average increase of 4.2 mph or 7.5% over the average speed with the conventional carbon fiber stick, with the fastest shot being 63 mph, and the slowest being 58 mph, resulting in a variation of only 5 mph or 4.13%. It was concluded that not only did the tested stick 10 of the present invention shoot the puck 15 faster than the conventional carbon fiber stick, but that the smaller variation by 33% in shooting speed between the fastest and slowest shots confirms that the blade 12 had a larger sweet spot 25 for consistently shooting the puck 15 at optimum speed, than the conventional carbon stick.

Referring to FIG. 15, shaft 40 is another embodiment of a shaft in the present invention and can be secured to blade 12 or integrally formed therewith. The shaft 40 can have two elongate edges 42 formed of elongate members 42a which are spaced apart from each other by a series of regularly spaced connecting members 44 extending between and connecting to the edges 42 at right angles in a truss-like configuration, with rectangular openings 46 therebetween. The edges 42 and connecting members 44 of the shaft 40 can be integrally formed from composite material 26 with the scrambled amorphous fibers 28 in thermosetting resin 30. The connecting members 44 can be spaced apart from each other about 1.5 inches, and the shaft 40 can have a cross section that is about 1.19×0.69 inches. The shaft 40 can be used in this truss-like configuration to provide even less wind resistance, or if desired, can have a thin light weight skin. If desired unidirectional fibers 28 can be included.

Figure 16B:
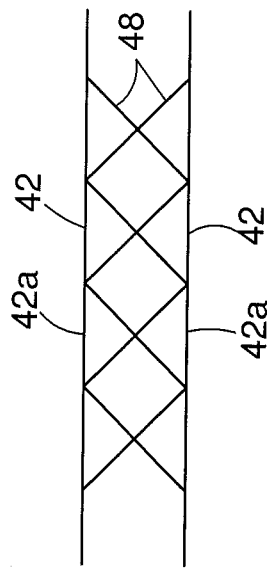
FIG. 16B is a schematic drawing of another embodiment of a shaft.

Referring to FIG. 16A, shaft 50 is another embodiment of a shaft which differs from shaft 44 in that connecting members 48 are connected to the elongate members 42a at angles in a zig zag pattern, forming triangular shaped openings 52 therebetween. In some embodiments, additional connecting members 48 can be included to form an x shaped pattern in addition to the zig zag pattern, as seen in FIG. 16B.

Figure 17:
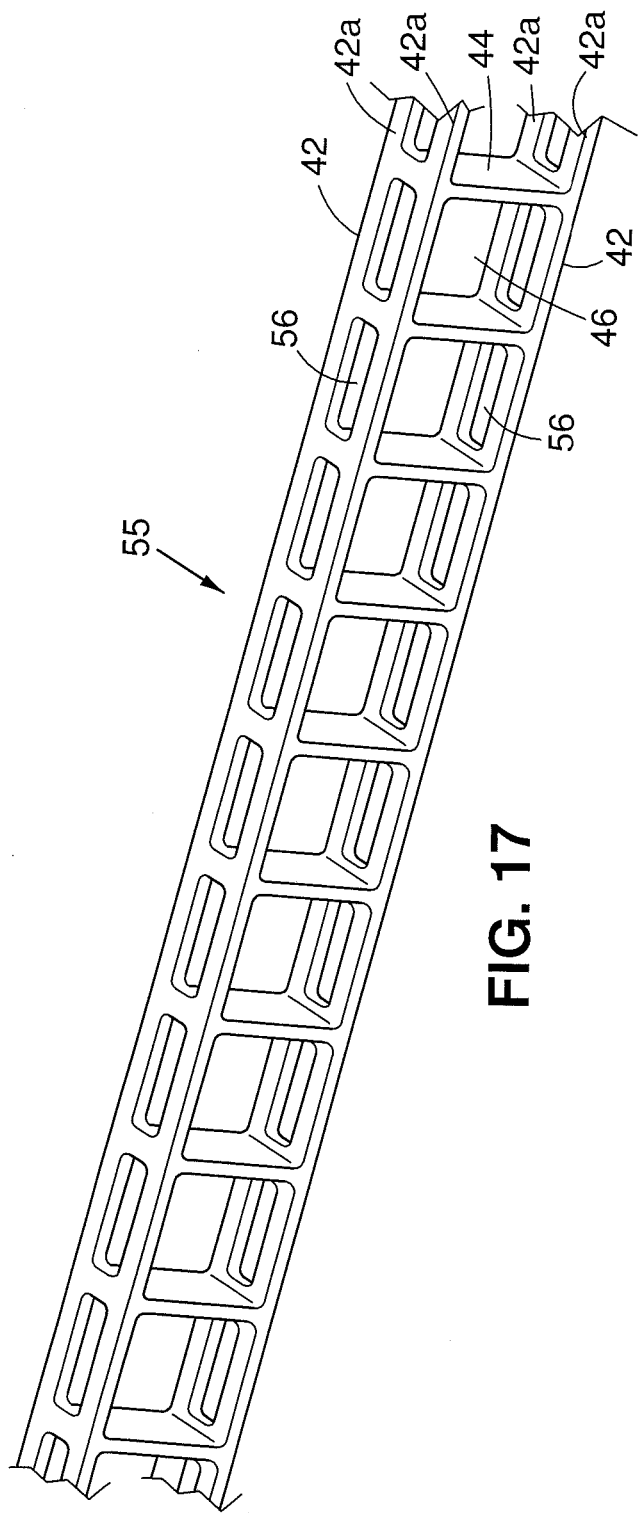
FIG. 17 is a perspective view of yet another embodiment of a shaft.

Referring to FIG. 17, shaft 55 is another embodiment of a shaft which differs from shaft 44 in that the elongate edges 42 can each be formed of two parallel spaced elongate members 42a having spaces or openings 56 between the elongate members 42a and the connecting members 56.

Figure 4:
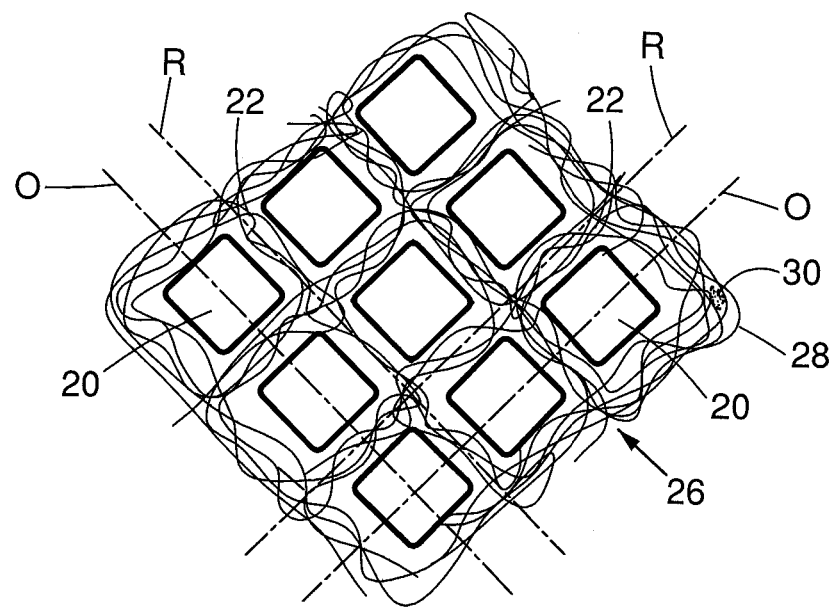
FIG. 4 is a schematic drawing of an embodiment of the composite material in the central blade region of the blade.
Figure 18:
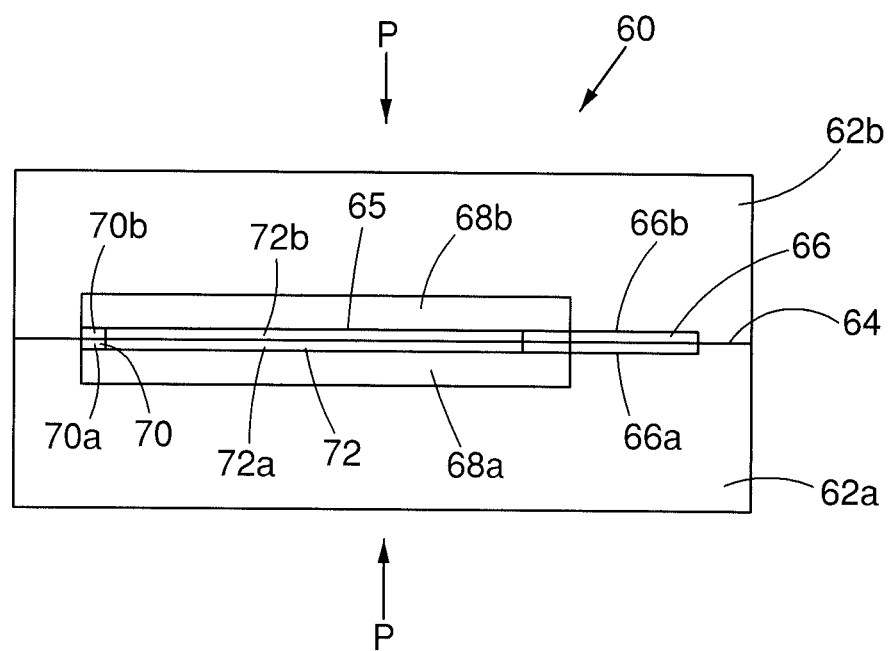
FIG. 18 is a schematic drawing of an embodiment of a mold in the present invention for molding a blade for a hockey stick.
Figure 19:
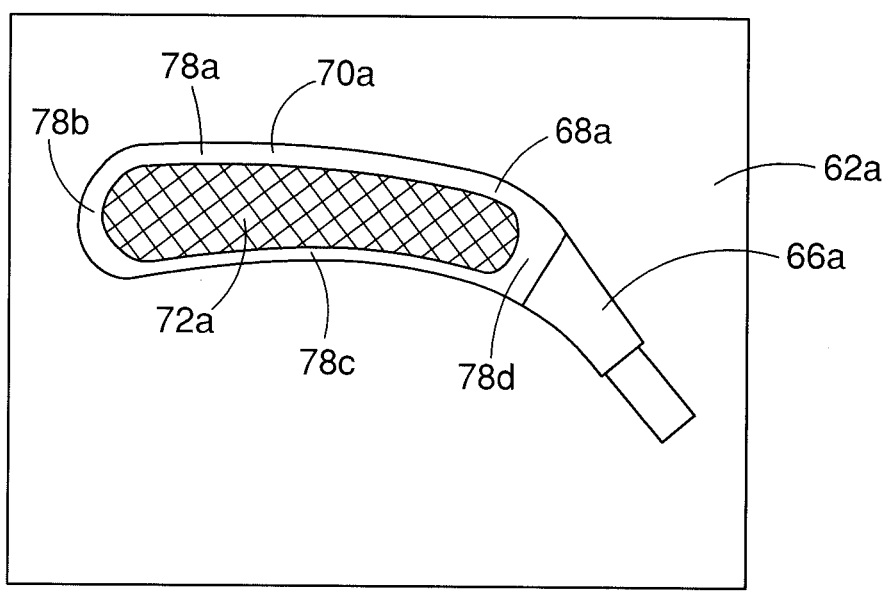
FIG. 19 is a schematic drawing of an embodiment of one mold half.

Referring to FIGS. 18-20, mold 60 is an embodiment of a mold in the present invention that can be used for making blade 12. Mold 60 can have first 62a and second 62b mold halves which can be opened for loading a blank 65 of prepregnated composite material 26, and then joined together under pressure P, for example up to 100 tons of pressure P with a hydraulic press for compression molding. The blank 65 can be a sheet of moldable composite material 26 (FIG. 3) with the short discontinuous scrambled amorphous fibers 28 that can be 1-3 inches long premixed, prepregnated or preloaded with thermosetting resin 30 to near 100% saturation. The blank 65 can be cut to the appropriate size and shape and inserted between first 66a and second 66b mold cavity halves, which together form the completed mold cavity 66 of mold 60. If laminates 34 are used, the laminates 34 can be included into or applied to the blank 65 in the proper location and orientation. The first 62a and second 62b mold halves can have first 70a and second 70b blade periphery cavity halves surrounding first 72a and second 72b central protrusion regions. The mold halves 62a and 62b can include first and second mold inserts 68a and 68b which can include the blade periphery cavity halves 70a and 70b and/or the central protrusion regions 72a and 72b. The central protrusion regions 72a and 72b can include first and second patterns or matrixes of evenly spaced raised mold protrusions or protrusion members 74 arranged and extending along axes O and spaced apart from each other by criss crossing or intersecting grooves or cavities 76 that extend along axes R between and connect different surrounding sides 78a, 78b, 78c and 78d of the blade periphery cavity halves 70a and 70b to each other, and which corresponds with openings 20 and ribs 22 of blade member 16. In the embodiment shown, the protrusions 74 have a square cross section which is oriented at a 45° angle to appear as a diamond, and the protrusions 74 are arranged in a diamond pattern corresponding to that in FIG. 1. When the mold halves 62a and 62b are joined together under pressure P, the blade periphery cavity halves 70a and 70b combine to form a completed blade periphery mold cavity or portion 70 which surrounds a completed central protrusion region 72. The completed blade periphery mold cavity 70 molds the composite material 26 with amorphous fibers 28 therein into the blade periphery 16a. The protrusions 74 of the first 72a and second 72b central protrusion regions, combine to form a completed central protrusion region 72 in which the protrusions 74 of one region 72a are aligned with the protrusions 74 of the other region 72b to form a series of criss crossing or intersecting cavities that extend between and connect different surrounding sides 78a, 78b, 78c and 78d of the blade periphery mold cavity 70. As the mold halves 62a and 62b join or move together, the aligned protrusions 74 moving towards each other push or penetrate into the composite material 26 (FIG. 3) of the blank 65 and when coming together, position, orient, push, move and align the fibers 28 to extend around the protrusions 74, thereby aligning and molding portions of each fiber 28 into the cavities 76 therebetween, and molding a plurality of fibers 28 that substantially extend along the axis R of the ribs 22 of the blade member 16 (FIG. 4). At the same time, the fibers 28 remain unaligned in the blade periphery mold cavity 70 and the resulting blade periphery 16a. If desired, an insert member can be included for forming the securement member 12a, and can be removed after the mold 60 is opened. Ejection pins can help remove the finished blade 12. The mold 60 can be heated for curing the prepregnated composite material 26. The thermosetting resin 30 that is chosen preferably flows immediately and cures quickly. Heat and pressure in the mold 60 can complete the cross linking to cure the resin 30. In some embodiments, the mold cavity 66 of mold 60 can also be configured for molding a shaft integrally with the blade 12. In some embodiments, only one mold halve 62a or 62b or insert 68a or 68b has protrusions 74, and if desired, one face 21 of the finished blade 12 can have a smooth face.

While this invention has been particularly shown and described with references to example embodiments thereof, it will be understood by those skilled in the art that various changes in form and details may be made therein without departing from the scope of the invention encompassed by the appended claims.

Although particular dimensions, shapes and sizes have been described, it is understood that these can vary depending upon the situation at hand. It is also envisioned that the stick 10 and blade 12 in the present invention does not have to be just an ice hockey stick or blade, but can also be or be for other sports sticks or apparatuses such as a floor, field or street hockey stick or blade. In addition, the periphery 16a and central region 16b can be formed into a paddle or racket shape. As a result, member 16 can be a paddle or racket shape having a frame or rim 16a that dampens vibrations of the "strings" formed by the ribs 22 of the central region 16b. The shaft 14, 40, 50 or 55 can be the handle of the racket or paddle sports apparatus.

What is claimed is:

1. A blade for a hockey stick comprising;
a blade member integrally formed of composite material having discontinuous fibers bonded within thermosetting resin, the blade member comprising a blade periphery surrounding a central blade region, the central blade region having a plurality of openings arranged in a pattern to form a series of elongate criss crossing ribs that extend between and connect different sides of the blade periphery to each other, the fibers in the blade periphery being in a generally jumbled orientation, and the fibers in the central blade region being positioned within the ribs in a manner wherein each rib contains a plurality of fibers that substantially extend in said each rib's elongate direction.

2. The blade of claim 1 in which the plurality of openings in the central blade region are arranged in a diagonal pattern relative to the blade member to form a series of elongate criss crossing diagonal ribs.

3. The blade of claim 2 in which the openings are rectangular openings that are each oriented at an angle as a diamond shape.

4. The blade of claim 1 in which the fibers are about 1-3 inches long.

5. The blade of claim 1 in which the fibers are selected from the group consisting of carbon fiber, glass fiber and aramid fiber.

6. The blade of claim 1 in which the blade member has opposite front and rear blade faces, at least a portion of the blade periphery having a layer of unidirectional fibers laminated thereon, on at least one of the front and rear blade faces.

7. The blade of claim 1 in which the blade member includes a series of spaced raised protrusions on at least a front blade face.

8. The blade of claim 7 in which the raised protrusions extend about 0.04 inches and are spaced about ⅛ to ¼ inches apart from each other.

9. The blade of claim 1 in which the blade member is formed from a sheet of prepregnated composite material.

10. The blade of claim 1 in which about 33% to 63% of the central blade region is open area formed by the plurality of openings.

11. A blade for a hockey stick comprising;
a blade member integrally formed of composite material having discontinuous carbon fibers bonded with thermosetting resin, the blade member comprising a blade periphery surrounding a central blade region, the central blade region having a plurality of openings arranged in a diagonal pattern relative to the blade member to form a series of elongate criss crossing diagonal ribs that extend between and connect different sides of the blade periphery to each other, the fibers in the blade periphery being in a generally jumbled orientation, and the fibers in the central blade region positioned within the ribs in a manner wherein each rib contains a plurality of fibers that substantially extend in said each rib's elongate direction.

12. A hockey stick comprising;
a blade including a blade member integrally formed of composite material having discontinuous fibers bonded within thermosetting resin, the blade member comprising a blade periphery surrounding a central blade region, the central blade region having a plurality of openings arranged in a pattern to form a series of elongate criss crossing ribs that extend between and connect different sides of the blade periphery to each other, the fibers in the blade periphery being in a generally jumbled orientation, and the fibers in the central blade region being positioned within the ribs in a manner wherein each rib contains a plurality of fibers that substantially extend in said each rib's elongate direction; and
a shaft connected to the blade.

13. A method of forming a blade for a hockey stick comprising;
integrally forming a blade member from composite material having discontinuous fibers within thermosetting resin to have a blade periphery surrounding a central blade region, the central blade region having a plurality of openings arranged in a pattern to form a series of elongate criss crossing ribs that extend between and connect different sides of the blade periphery to each other;
forming the blade periphery in which the fibers are in a generally jumbled orientation; and
orienting the fibers in the central blade region within the ribs in a manner wherein each rib contains a plurality of fibers that substantially extend in said each rib's elongate direction.

14. The method of claim 13 further comprising forming the blade member from a sheet of prepregnated composite material.

15. The method of claim 14 further comprising molding the sheet of prepregnated composite material in a mold, and forming the plurality of openings in the central blade region with mold protrusion members, the mold protrusion members also positioning and orienting the fibers within the ribs.

16. The method of claim 13 further comprising forming the plurality of the openings in the central blade region in a diamond pattern relative to the blade member, thereby forming a series of elongate criss crossing diagonal ribs.

17. The method of claim 16 further comprising forming the openings as rectangular openings that are each oriented at an angle as a diamond shape.

18. The method of claim 13 further comprising forming the blade member from composite material having fibers about 1-3 inches long.

19. The method of claim 13 further comprising selecting the fibers from the group consisting of carbon fiber, glass fiber and aramid fiber.

20. The method of claim 13 further comprising laminating a layer of unidirectional fibers on at least a portion of the blade periphery, and on at least one of front and rear blade faces of the blade member.

21. The method of claim 13 further comprising forming a series of spaced raised protrusions on at least a front blade face.

22. The method of claim 21 further comprising forming the raised protrusions to extend about 0.04 inches and about 1/8 to 1/4 inches apart from each other.

23. The method of claim 13 further comprising forming the central blade region with about 33% to 63% open area with the plurality of openings.

24. A method of forming a blade for a hockey stick comprising;
integrally forming a blade member from composite material having discontinuous carbon fibers within thermosetting resin to have a blade periphery surrounding a central blade region, the central blade region having a plurality of openings arranged in a diagonal pattern relative to the blade member to form a series of elongate criss crossing diagonal ribs that extend between and connect different sides of the blade periphery to each other;
forming the blade periphery in which the fibers are in a generally jumbled orientation; and
orienting the fibers in the central blade region within the ribs in a manner wherein each rib contains a plurality of fibers that substantially extend in said each rib's elongate direction.

25. A method of forming a hockey stick comprising;
integrally forming a blade member of a blade from composite material having discontinuous fibers within thermosetting resin to have a blade periphery surrounding a central blade region, the central blade region having a plurality of openings arranged in a pattern to form a series of elongate criss crossing ribs that extend between and connect different sides of the blade periphery to each other;
forming the blade periphery in which the fibers are in a generally jumbled orientation;
orienting the fibers in the central blade region within the ribs in a manner wherein each rib contains a plurality of fibers that substantially extend in said each rib's elongate direction; and
connecting a shaft to the blade.

* * * * *